United States Patent
Parisi

[15] 3,650,804
[45] Mar. 21, 1972

[54] PROCESS FOR DECREASING PERMEABILITY OF A POROUS BODY AND THE PRODUCT THEREOF

[72] Inventor: Anthony Parisi, Albuquerque, N. Mex.

[73] Assignee: The United States of America as represented by the United States Atomic Energy Commission

[22] Filed: Feb. 19, 1969

[21] Appl. No.: 800,667

[52] U.S. Cl. ............................ 117/49, 117/61, 117/65.2, 117/99, 117/132 B, 29/530, 117/DIG. 9
[51] Int. Cl. ........................................................ B44d 1/34
[58] Field of Search ............... 117/49, 61, 69, 65.2, 132 B; 29/530

[56] References Cited

UNITED STATES PATENTS 2,145,291   1/1939   Boyle ............................ 117/49
2,376,706   5/1945   Lum ............................. 117/49

Primary Examiner—Alfred L. Leavitt
Assistant Examiner—Janyce A. Bell
Attorney—Roland A. Anderson

[57] ABSTRACT

A process for decreasing the permeability of a porous body and the resulting product wherein a preferably highly fluid synthetic resin sealant is impressed under pressure into pores on one surface of a normally porous body until resin has bled through the body to a desired depth or to an opposite surface completely filling the pores of the body and then curing the synthetic resin sealant in said pores. Such a body may be made impervious to gas pressures exceeding the tensile limit of the body.

8 Claims, 4 Drawing Figures

Patented March 21, 1972
3,650,804
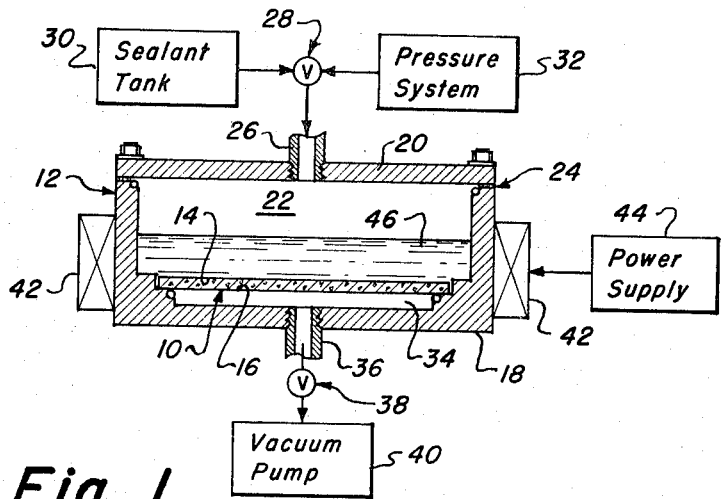
Fig. 1
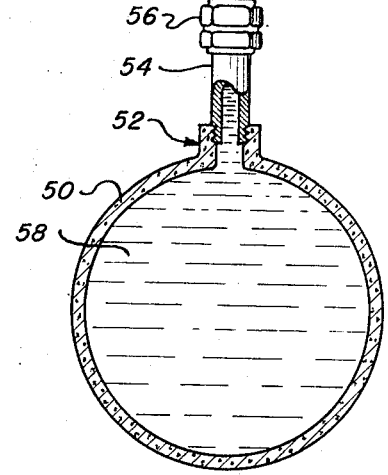
Fig. 2
Fig. 3
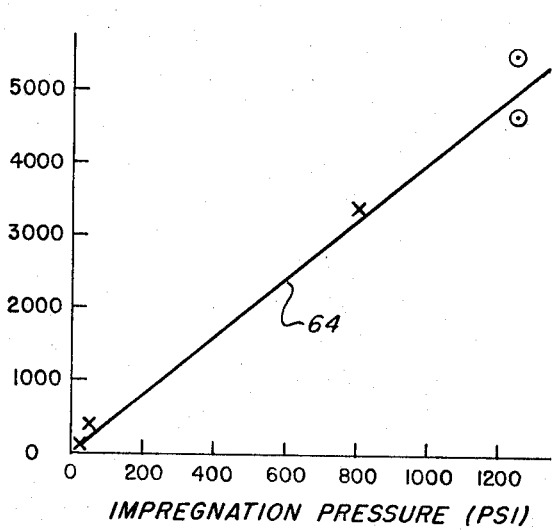
Fig. 4
⊙ TEST POINTS FOR VESSEL OF FIG. 2
✕ TEST POINTS FOR VESSEL OF FIG. 3
INVENTOR.
Anthony Parisi
BY
Attorney

PROCESS FOR DECREASING PERMEABILITY OF A POROUS BODY AND THE PRODUCT THEREOF

BACKGROUND OF INVENTION

Castings, particularly metal castings, are presently widely used in industry. This extensive use is at least partly explained by the fact that castings may be readily and relatively inexpensively formed into any desired shape or configuration of any size, small or large. The more complex the shape and larger the size, the lower the cost relative to other forming techniques. Another advantage of castings is that the cast material exhibits high strength in all directions.

It is desirable in modern industry and technology, such as in the transportation industry particularly aircraft and the more recent nuclear and space applications, to reduce weight wherever possible by the selection of lightweight metals such as aluminum, magnesium, titanium, etc., and their alloys. It is also desirable in many cases that these materials be formed or shaped as needed by conventional casting techniques. Some of these applications, however, require materials which are substantially impervious or have low permeability, which, as is well known in the art, is not the case for castings. Castings, regardless of the quality of foundry practice, are inherently porous. The porosity and size of pores may be controlled by good foundry practice but they have not been entirely eliminated.

Examples of such applications include pressure bottles for containing gas or fluids for rocket propulsion or guidance and structural or other members subjected to high temperatures and air pressures in high speed aircraft. Where weight is a problem such as in certain pressure bottle applications, it would be particularly desirable to use castings of such materials as aluminum or its alloys. Such a bottle may be cast as part of a complex containment system with a single casting without use of weldments with its inherently weak welds.

Prior attempts to impregnate castings to reduce permeability or make them impervious such as by total immersion in a sealant with or without pressure have not proved satisfactory to contain pressures above 10 p.s.i.

It would also be desirable to provide low cost castings which could be made impervious to predicted levels of gas pressures without undue processing costs, even to the tensile limit of the casting itself.

SUMMARY OF INVENTION

In view of the limitations of the prior art, it is an object of this invention to provide a process for producing a cast body impervious to predictable levels of gas pressure.

It is a further object of this invention to provide a process for producing a cast body impervious to gas pressures in excess of the tensile limit of the body.

A further object of this invention is to provide a low cost, impervious member.

Various other objects and advantages will appear from the following description of the invention, and the most novel features will be particularly pointed out hereinafter in connection with the appended claims.

The present invention comprises impressing a fluidized synthetic resin sealant into the pores of a surface of the wall or walls of a normally porous body, bleeding the sealant at least partially through the walls of the body until all pores are filled to a desired depth and then curing the resin in the pores of the body.

DESCRIPTION OF DRAWINGS

Aspects of the present invention are illustrated and described in the accompanying drawings wherein:

FIG. 1 is a diagrammatic and partially cross-sectional view of an apparatus which may be used to perform the process;

FIG. 2 is a cross-sectional view of a pressure container which may be treated by the present process;

FIG. 3 is a partially cutaway perspective view of another example of a pressure container; and FIG. 4 is a graph showing the permeability characteristics of the castings shown in FIGS. 2 and 3 for various levels of process pressures.

DETAILED DESCRIPTIONS

The present process includes the steps of applying a synthetic resin sealant under pressure against a surface of a wall or walls of a normally porous cast body, bleeding the resin through the pores of the wall until the resin flows to a desired depth such as completely through the wall and then curing the resin in the walls. Additional steps of heating the resin to fluidize the resin, heating the cast body to maintain the fluidity and flow rate of the resin during impregnation, cleaning the cast body as well as others and modifications thereof may also be used when desired.

FIG. 1 illustrates apparatus which may be used to practice the process of the present invention. In this figure, the casting or cast body 10 is shown as a flat plate or member. It is understood that the cast body may have any desired shape or configuration for a particular use or application and that the process equipment may be modified as appropriate to accommodate the cast body in accordance with the process hereinafter described. The process equipment is shown in simplified form only by way of example and may be modified or changed as required or replaced where applicable by conventional equipment.

In FIG. 1, cast body 10 is shown supported in a suitable pressure vessel 12 with a pair of opposing surfaces or faces 14 and 16 exposed or substantially exposed for processing. Vessel 12 includes a casting support and fluid containment portion 18 and a cover 20, together forming a process chamber 22. Cover 20 may be suitably fastened and sealed to portion 18 by any conventional means 24. The various parts and members of vessel 12 should be selected and designed to withstand the desired impregnation pressures and any desired evacuating levels as described in more detail below.

Cover 20 may be provided with appropriate inlets or fittings such as through piping or tubing 26 to permit access to chamber 22 during the process. Tubing 26 may be coupled through a conventional valve and conduit distributing system 28 to a conventional storage tank 30 and pressure generating system 32. Access to a lower portion 34 of chamber 22 on the opposite side of cast body 10 may be provided through tubing 36. Tubing 36, in turn may be coupled through a conventional valve and conduit distributing system 38 to the atmosphere or to a vacuum pump 40, as shown.

Vessel 12, may be heated when required by the process by any conventional heating system, such as heater 42 and power supply 44. Heater 42 may be any commercially available resistance, inductance, or the like, heater.

Cast body 10 may be used after an initial cleaning of foundry residues, such as sand, from the exterior surface or it may be subjected to additional cleaning or cleaning steps to remove any contaminants or residues from the pores of the casting. Such additional cleaning may be performed either within or separate from vessel 12. An appropriate cleaning may include positioning cast body 10 in vessel 12 as shown, closing and sealing vessel 12 with cover 20, distributing a solvent such as trichloroethylene over surface 14 of cast body 10 and then forcing the solvent through the cast body by pressure applied by pressure system 32 through valve system 28 and tubing 26 or by vacuum pump 40. Suitable cleaning pressures may vary from about 5 to 250 p.s.i. depending on the desired penetration of the cast body and the level of impermeability selected. In some applications, the cast body may be cleaned by simply immersing or rinsing the body in a cleaning fluid. After all the solvent is removed, cast body 10 may be dryed by heating the body with heater 42 with or without the use of vacuum pump 40. Additional cleaning may be achieved by further evacuating chamber 22 by vacuum pump 40 and/or an additional vacuum pump (not shown) acting through pressure system 32.

When cast body 10 has been prepared as desired, a synthetic resin sealant may be distributed over surface 14 of cast body 10 from storage tank 30 through valve system 28 as shown by fluid layer 46. A sufficient amount of resin should be supplied to chamber 22 to completely impregnate cast body 10 leaving at least a thin, complete layer covering surface 14 when the process is completed to insure complete impregnation.

Adsorbed or entraped gas may be removed from resin 46 by suitably evacuating chamber 22 as described above. This evacuating step may be substituted for the above cleaning evacuating step, if desired.

In order to insure complete and rapid impregnation of cast body 10, it may be desirable to increase the fluidity (e.g., decrease the viscosity) of the synthetic resin sealant. A particularly satisfactory way of increasing the fluidity of synthetic resins may be by heating the resin to some appropriate temperature above room temperature up to about 200° F. The resin may be heated in storage tank 30 before distribution in chamber 22 or it may be heated directly in chamber 22 by heater 42. Heating by heater 42 provides the additional desirable feature of heating cast body 10 which may aid in maintaining the increased fluidity of the resin and may effect some pore expansion and increase resin flow during the impregnation. The temperature at which the resin is heated may depend on the particular resin used.

Any appropriate commercially available synthetic sealing resin (including a curing agent or agents if required) may be used which exhibits the required low viscosity (fluidity), working life and cure temperature under the process environments such as an epichlorohydrin-bisphenol A-type expoxy resin having an epoxide equivalent of about 175–210. Any convenient curing agent or agent mixtures may be used which will decrease the resin viscosity and increase working life such as methyl nadic anhydride, benzyl dimethyl amine and various aromatic amines.

The upper portion of chamber 22 may then be pressurized to an appropriate pressure by pressure system 32 as described below to achieve a desired level of impermeability with valve system 38 coupled to atmosphere or vacuum pump 40. It will be readily apparent that as the impregnating pressure is increased, the complexity and cost of the respective portions and elements of vessel 12, valve system 28 and pressure system 32 may be increased so that for a given level of impermeability it is desirable to utilize the lowest convenient impregnation pressure. A wide range of impregnating pressures may be used, such as from about 25 p.s.i. to about 1,300 p.s.i., depending on the level of impermeability to be achieved. As the impregnating pressure increases, entrapped air or gas and other voids may be pressed out of the resin and cast body pores and more complete impregnation achieved to thus increase the level of impermeability. In order to maintain the fluidity of resin 46, it may be desirable that the temperature level of the resin be maintained during this impressing step.

As a result of the pressurization of chamber 22 and the fluidizing of resin 46, resin 46 is forced through the pores in surface 14 of cast body 10 and through the body itself. After a short period of time depending on the chamber 22 pressure, the casting thickness and the fluidity of resin 46, resin 46 may bleed through surface 16. After a complete "wetting" of surface 16 from the bleeding of resin 46 through cast body 10 (it has been found that about 5 to 20 minutes after initial bleed through may be sufficient) which is indicative of the complete "filling" of pores of cast body 10, chamber 22 may be depressurized and excess resin removed by any appropriate means such as through tube 36. Complete impregnations with initial bleed through have been achieved, depending primarily on pressure and on wall thickness, in about 2 to 5 minutes. The resin in the pores of cast body 10 may then be cured depending on the particular resin used and its characteristics, for example, by increasing the temperature of cast body 10 by heater 42 to the resin cure temperature, or in a separate curing oven, for the prescribed period of time required by the particular resin used. A typical cure may require a temperature of about 200° to 250° F. for periods from about 5 to 24 hours. The impregnated casting may then be cooled and further finished, machined or treated as required by its application or use.

It may be desirable in some applications that the cast body be impregnated for only a portion of its cross section or wall width. The required process time may be determined empirically for this situation to obtain repeatable depths of impregnation.

The casting or cast body may be made of any appropriate material for this process. In uses where weight is a factor, aluminum and magnesium and their alloys have been particularly useful. In order to insure minimum pores and pore sizes, good quality castings, commonly referred to as Class A castings, should be used if possible.

It will be apparent that the shape or configuration of the casting may affect the process equipment utilized in the process. For instance, an enclosed bottle or container, such as the cast spherical container 50 shown in FIG. 2, may be inverted and the container opening 52 coupled to tubing 36 of vessel 12. Opening 52 may include a raised boss with an initial threading, as shown, so that impregnation about opening 52 may be achieved. After impregnation, the boss may be removed and/or additional or enlarged threading applied before connecting the bottle in a pressure system. Resin 46 may then be filled to a level completely covering container 50 and the process utilized as described above to impress the resin against the outer periphery of container 50 and bleed the resin through to the interior thereof.

Vessel 12 may be eliminated, if desired, by attaching or coupling opening 52 through an appropriate pipe 54 and fitting 56 directly to valve system 28, storage tank 30 and pressure system 32. In this application, container 50 may be filled with the synthetic resin sealant or filler 58 and pressure applied thereto. A portion of pipe 54 should also be filled with resin 58 to maintain the interior of container 50 and opening 52 completely full at all times during the process. The resin may be preheated to the fluidizing temperature before filling container 50 and/or container 50 may be appropriately heated. The process may then proceed as described above.

FIG. 3 shows another more complex form of cast container 60 which may be treated by this process. Container 60 is annular in form having generally straight sides connected by curved fillets in a parabolic-like configuration. A complex casting similar to container 60 was prepared together with various other features (not shown) including outwardly disposed valves, solenoids and fittings to act as a plenum for a rocket attitude control system. The cast container 60 was treated in accordance with this process through entry 62 in the same manner as container 50 in FIG. 2.

It has been found that a cast body pressure-impregnated in accordance with this process to complete bleed through at some prescribed pressure will contain or be impervious to gas at a pressure in excess of about four times the impregnating pressure. This relationship is shown by curve 64 in FIG. 4. As shown by the test points in FIG. 4, containers 50 and 60 exhibited this feature. Thus, with a given design containment pressure, a cast container may be predictably and reliably impregnated to withstand this containment pressure without using unduly or unnecessarily high process pressures.

These test points were obtained from pressure bottles similar to containers 50 and 60 in FIGS. 2 and 3 cast from an aluminum-magnesium (5% Mg) alloy and processed as described with respect to FIG. 2. A pressure bottle similar to container 50 with an outside diameter of about 6 inches, a minimum wall thickness of about 0.3 inch, a calculated tensile limit of about 5,550 p.s.i. and cast of the same material was pressure impregnated with this process to complete bleed through at about 1,250 p.s.i. When tested, this pressure bottle was impervious to gas at all pressures to the actual burst or destruction pressure of 5,520 p.s.i. Aluminum cast bottles without impregnation were not able to contain any gas pressure while aluminum cast bottles impregnated by conventional pressure immersion techniques at about 90 p.s.i. failed to contain pressures of about 10 p.s.i.

This process provides an inexpensive and rapid method for increasing the impermeability of cast bodies, even to the elastic limit of the body. The impermeability level may be readily selected by selecting different levels of pressure impregnation and thus permit use of process equipment which does not have to be operable at pressures in excess of the desired level. Further, with enclosed cast bottles, the bottles themselves may be used as the pressure vessel decreasing still further the cost of process equipment while permitting processing of complex and large castings.

It may be desirable to use this process in other applications and types of materials such as for impregnation of sintered materials and ceramics.

It will be understood that various changes in the details, materials and arrangements of the parts, which have been herein described and illustrated in order to explain the nature of the invention, may be made by those skilled in the art within the principles and scope of the invention as expressed in the appended claims.

What is claimed is:

1. A process for reducing permeability of a normally porous cast container body for containment of pressurized liquid and gaseous fluid at a preselected pressure comprising the steps of disposing a fluid synthetic resin sealant contacting only a first surface of said normally porous cast container body, impressing the fluid synthetic resin into pores of said body at said first surface and only from said first surface toward an oppositely disposed surface at a pressure greater than about 25 percent of the preselected pressure, maintaining said oppositely disposed surface of said body free of pressurized sealant, bleeding the synthetic resin by said impressing at least partially through said body and filling pores therein with said resin beginning at said first surface and continuing through said body towards said oppositely disposed pressurized-sealant-free surface, and curing the synthetic resin in said pores.

2. The process of claim 1 including the step of heating said synthetic resin sealant to a temperature for increasing the fluidity of said sealant.

3. The process of claim 2 wherein said resin is a thermosetting resin and said curing includes heating said synthetic resin filled body to a curing temperature at least as great as the initial heating temperature.

4. The process of claim 1 including the additional step of cleaning the pores of said body prior to impressing of the resin by subjecting said first surface of said body to a solvent under pressure, bleeding said solvent through said body beginning with pores at said first surface and continuing entirely through said body to said oppositely disposed surface, and thereafter removing said solvent from said body and pores.

5. The product formed by the process of claim 1.

6. The process of claim 1 including the step of continuing said impressing and bleeding until said resin bleeds completely through said oppositely disposed surface from said first surface of said body.

7. The process of claim 6 wherein said impressing pressure is also at least about 25 percent of the tensile limit of said body.

8. The process of claim 6 comprising the additional step of heating said resin and said body during impregnation for maintaining the fluidity of said synthetic resin.

* * * * *